United States Patent [19]

Freid

[11] 3,844,115
[45] Oct. 29, 1974

[54] LOAD DISTRIBUTING THRUST MOUNT

[75] Inventor: Wilbert Bernard Freid, Swampscott, Mass.

[73] Assignee: General Electric Company, Lynn, Mass.

[22] Filed: Feb. 14, 1973

[21] Appl. No.: 332,435

[52] U.S. Cl. ............... 60/39.31, 60/39.32, 244/54, 248/5
[51] Int. Cl. .......................... F02c 7/20, B64d 27/16
[58] Field of Search .......... 60/39.31, 39.32; 244/54; 248/5

[56] References Cited
UNITED STATES PATENTS

| | | | |
|---|---|---|---|
| 2,457,340 | 12/1948 | Berry | 248/5 |
| 2,477,501 | 7/1949 | Tyler et al. | 248/5 |
| 2,720,370 | 10/1955 | Hasbrouk | 248/5 |
| 3,188,808 | 6/1965 | Crooks | 60/39.32 X |
| 3,675,418 | 7/1972 | Lenkelt et al. | 60/39.31 |

FOREIGN PATENTS OR APPLICATIONS

| | | | |
|---|---|---|---|
| 798,832 | 7/1958 | Great Britain | 248/5 |

*Primary Examiner*—Carlton R. Croyle
*Assistant Examiner*—Robert E. Garrett

[57] ABSTRACT

A load distributing thrust mount arrangement is provided for imparting the propulsive thrust of a gas turbine engine to a vehicle. In the thrust mount arrangement there is provided a dowel extending from the vehicle wherein the dowel is slidably engaged by a collar. The thrust load distribution is accomplished by a thrust member extending forwardly from the collar into rotatable connection with the engine casing and by a thrust link extending rearwardly from the collar into axially spaced apart rotatable connection with the engine casing.

8 Claims, 3 Drawing Figures

PATENTED OCT 29 1974

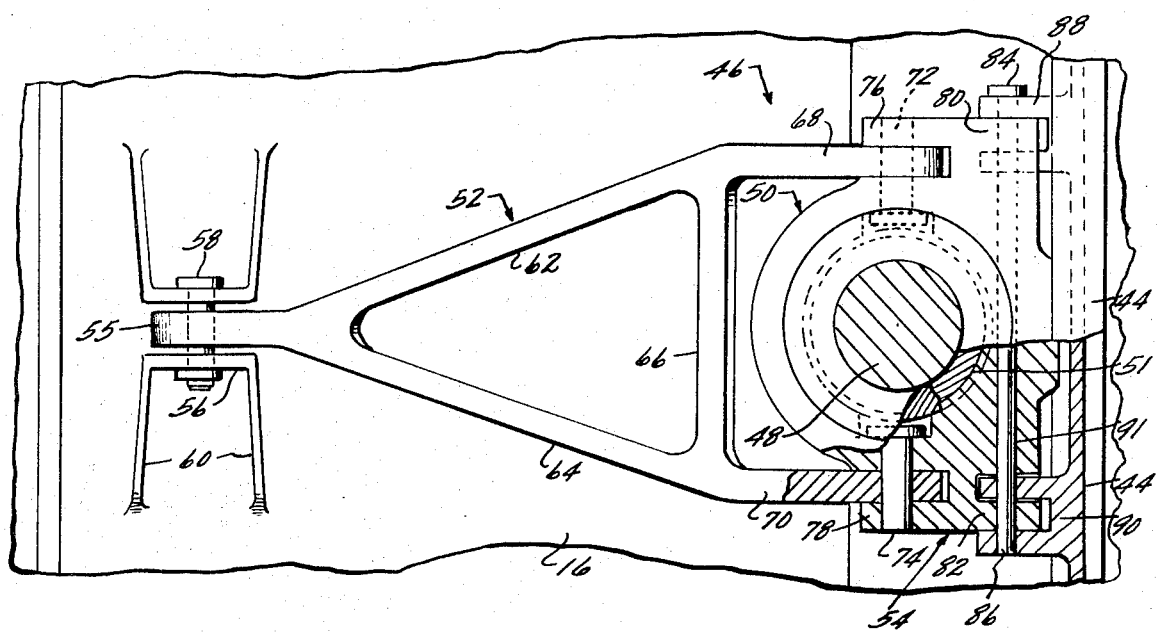

3,844,115

LOAD DISTRIBUTING THRUST MOUNT

BACKGROUND OF THE INVENTION

This invention generally relates to a load distributing thrust mount for a gas turbine engine and, more particularly, to a thrust mount arrangement for a gas turbine engine wherein the thrust load is directed to two axially spaced apart locations along the length of the engine casing so as to reduce the maximum engine bending moment resulting from engine thrust.

The invention herein described was made in the course of or under a contract or subcontract thereunder (or grant) with the Department of the Navy.

Thrust mounts are well known to the gas turbine jet engine art and are generally provided in order to transmit the forward propulsive thrust of a jet engine to a vehicle. Thrust mounts are generally used in conjunction with forward and aft hanging mounts which sustain the weight of the engine and its accessories relative to the vehicle. The type of vehicle most often propelled by the jet reaction thrust of a gas turbine engine is an aircraft, although land based vehicles and water borne vessels have also on occasion been propelled by jet engines.

The jet reaction thrust of a gas turbine engine generally operates along the center line of the engine. When the thrust forces generated by such an engine are imparted to a vehicle through a single transfer point which is off the axial center line of the engine, there is incurred a high bending moment at the exact point of thrust transfer. This bending moment has an arm equal to the distance between the point of thrust transfer and the axial center line of the engine and is countered by equal and opposite forces at the forward and aft hanging mounts. For a typical aircraft installation having a jet engine mounted beneath a wing pylon with a single thrust transfer point on the engine casing, there is a bending moment on the engine equal to the product of the thrust load and the radial distance between the engine casing and the axial center line of the engine.

For an engine having only fore and aft rotor bearings, the bending moment may induce a radial distortion or deflection in the engine casing without inducing a corresponding deflection in the rotor shaft. In such a situation the engine case distortion may result in what is commonly referred to as a "compressor, turbine or seal rub." Such rubs occur when the tips of the turbine blades or compressor blades or the seal scrape against the inner surface or their associated shrouds. Engine thrust and efficiency generally depend upon the close clearance maintained between the blades, seals, and shroud. Should the blades or seals rub against their associated shrouds, the close clearances may be enlarged with a corresponding decrease in engine thrust and efficiency.

Another phenomenon commonly encountered when the jet reaction thrust of a gas turbine engine is imparted to a vehicle through a single transfer point which is spaced apart from the center axis of the engine is a localized deflection of the engine casing commonly referred to as ovalization. This localized deflection may likewise lead to compressor, turbine or seal rubs with the same deleterious effects on engine thrust and efficiency as previously discussed.

Early jet engines encountered both radial casing deflection along the length of the engine and localized casing deflection in the area of thrust transfer. However, neither phenomenon caused any real concern due to the general low thrust levels of the early engines and the large clearances between the rotating and stationary engine components. However, with the advent of modern high thrust engines having close clearances between rotating and stationary components, the adverse effects from distortion and deflection of the engine casing have become more pronounced. One recent attempt at reducing the localized type of casing deflection referred to as ovalization is disclosed in U.S. Pat. No. 3,675,418 to Lenkeit et al. wherein the thrust load is divided between two coplanar pickup points on the engine casing separated by 120° of arc. Lenkeit et al., however, did not generally address themselves to the problem of radial deflection of the engine casing caused by a high bending moment at the point of thrust transfer although they did note a certain windfall in this area. Lenkeit et al pick up the entire thrust load of the engine through two arcuately spaced apart points which are located in a single plane normal to the engine axis. Such a scheme may still be susceptible to high bending moments and large radial deflections along the engine casing under high thrust loads.

Therefore, it is a primary object of this invention to provide a load distributing thrust mount arrangement for a gas turbine jet engine which substantially reduces deflection and distortion within the engine casing.

It is also an object of this invention to provide a load distributing thrust mount arrangement for a gas turbine engine which reduces the risk of either the blades or seals scraping against their associated shrouds.

It is a further object of this invention to provide a load distributing thrust mount arrangement for a gas turbine engine which directs the thrust load to two axially spaced apart locations on the engine casing so as to reduce the maximum engine bending moment and thereby reduce the overall risk of radial deflection along the engine casing.

SUMMARY OF THE INVENTION

Briefly stated, the above and other related objects are attained by providing a load distributing thrust mount for imparting the propulsive thrust of a gas turbine engine to a vehicle. The thrust mount includes a provision for a dowel extending outwardly from the vehicle in general orthogonal alignment to the axis of the gas turbine engine. A collar is provided in slidable engagement with the dowel and in spaced apart relation to the outer casing of the engine. There is also provided a rigid thrust member between the collar and engine casing in rotatably pinned connection to the engine casing at a location forward of the collar. A rigid thrust link is further provided between the collar and engine casing in pinned connection to the engine casing at a location aft of the collar. Both the rigid thrust member and rigid thrust link coact to distribute the thrust load to two axially spaced apart locations on the engine casing so as to reduce the maximum engine bending moment.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 3 is an enlarged plan view, partly in cross section, showing the thrust mount arrangement of this invention.

DESCRIPTION OF THE PREFERRED EMBODIMENT

Figure 1:
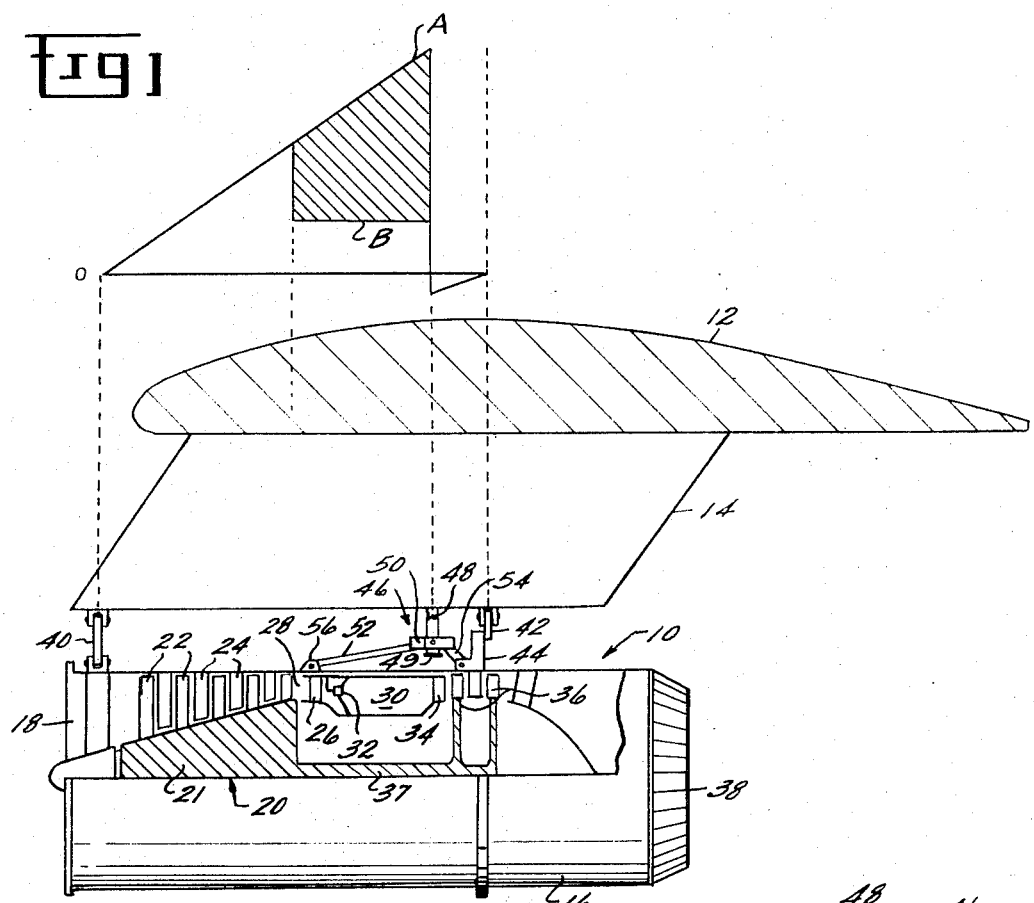
FIG. 1 is a side view, partly in cross-section, of a typical gas turbine engine embodying the thrust mount arrangement of this invention.

Referring to FIG. 1, there is shown an arrangement by which a gas turbine engine 10 may be mounted through a pylon 14 to a wing 12 of an aircraft. The gas turbine engine 10 includes a cylindrical casing 16 open at one end to provide an inlet 18 for an axial flow compressor 20. The compressor 20 comprises a rotatable drum 21 having a number of rows of axially spaced blades 22 extending from the surface of the drum 21 so as to impart a velocity pressure to the air passing thereacross. Axially spaced rows of stator vanes 24 extend radially inward from the casing 16 in interposed relation between the rotor blades. Stator vanes 24 may be of the variable type as is well known in the gas turbine art. A series of downstream exit guide vanes 26 in a diffuser passageway 28 enable the static pressure of the air to be increased for discharge to a combustion chamber 30. Fuel is injected into the combustion chamber 30 through a series of fuel nozzles 32, and the resultant mixture ignited to increase the energy level of gases. Pressurized fuel is supplied to the nozzles 32 from a source which is not shown. The hot gases of combustion are discharged through a turbine inlet nozzle 34 and through a compressor driving turbine 36 which is connected to drive the compressor through a shaft 37.

The gas turbine engine 10 is suspended relative to the pylon 14 by a forward hanging mount shown generally at 40 and an aft hanging mount shown generally at 42. The aft hanging mount 42 connects to a mount roll ring 44 which may be in the form of a circumferential I-beam provided around the engine 10 to insure rigidity in the area of the turbine 36. The forward and aft hanging mounts 40, 42 are designed to sustain primarily the weight of the gas turbine engine 10 and its accessories, and a load distributing thrust mount assembly shown generally at 46 is provided to impart the forward thrust of the engine 10 to the pylon 14. The thrust mount assembly 46 includes a collar or bearing 50 which slidably engages a dowel or rod 48 extending downwardly from the pylon 14. Whereas the collar 50 is free to slide along the longitudinal length of the dowel 48 in a direction orthogonal to the engine axis, it becomes immediately obvious that the thrust mount 46 plays no role in sustaining the weight of the engine relative to the pylon 14. However, the lower end of dowel 48 may include a flange 49 which will engage the collar 50 and sustain the weight of the engine 10 in the event that the aft hanging mount 42 should fail. The collar 50 of the thrust mount 46 is maintained in fixed relation relative to the engine casing 16 by a forwardly extending thrust frame member 52 and by two rearwardly extending thrust links 54 which may be formed integral with collar 50. As now becomes obvious, the forward propulsive thrust of the gas turbine engine 10 is imparted to the pylon 14 by the lateral engagement of the collar 50 with the rod 48.

Figure 2:
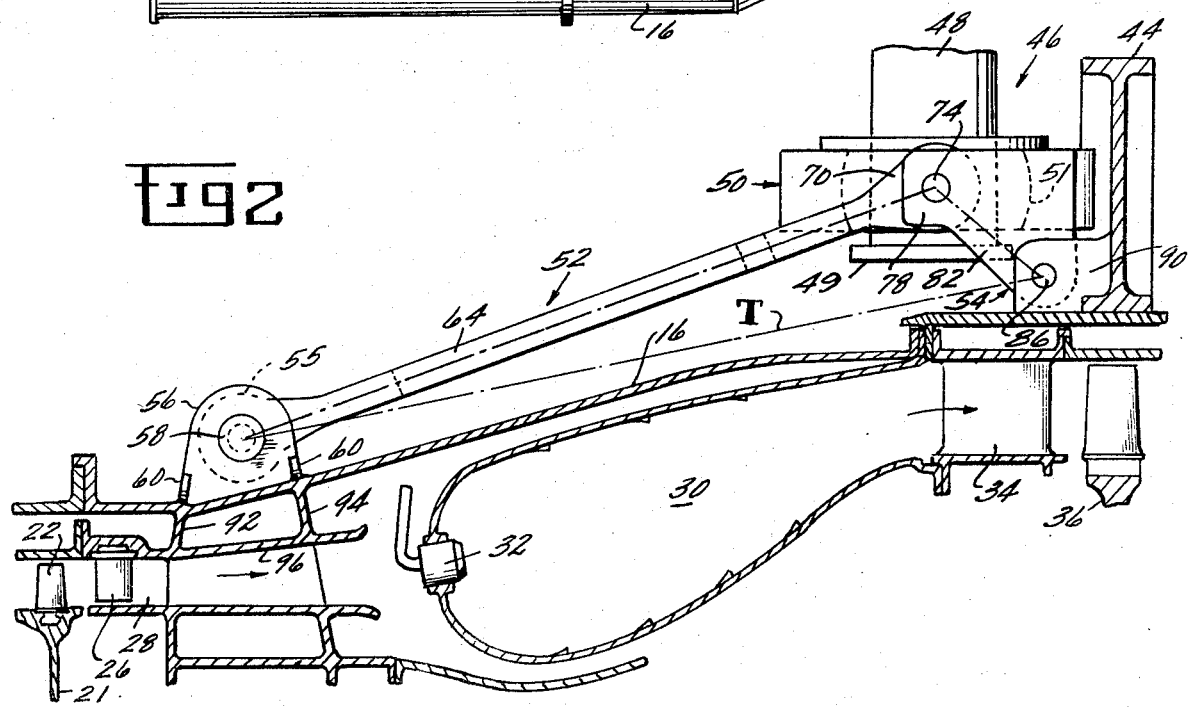
FIG. 2 is an enlarged side view, partly in cross section, showing the thrust mount arrangement of the invention together with a portion of the combustor, compressor and turbine of the gas turbine engine of FIG. 1.

Referring now to FIGS. 2 and 3 where like numerals designate previously described elements, there can be seen in greater detail the thrust mount 46 of this invention. The collar 50 includes a spherical bearing 51 for slidably engaging the dowel 48 to accommodate slight changes in engine position. The thrust frame member 52 includes a forwardly extending link member 55 which is rotatably pinned at 58 to a clevis 56 which may be formed integral to the engine casing 16 and which extends outwardly therefrom. Supporting webs 60 formed integral to the engine casing 16 may also be provided for additional bracing to the clevis 56. The thrust frame member 52 also includes two diverging link members 62, 64 which are joined at their aft ends by an interconnecting link member 66. There are further provided two integral circumferentially spaced apart link members 68, 70 extending rearwardly from the thrust frame member 52. The collar 50 includes two spaced apart clevises 76 and 78 which are formed integrally therewith, and which receive the rearwardly extending link members 68 and 70 respectively from the thrust frame member 52. Link members 68 and 70 are rotatably pinned in clevises 76 and 78 by coaxially spaced apart pins 72, 74 respectively.

The thrust links 54 may also be integrally formed with the collar 50 as two spaced apart and inwardly extending link members 80, 82 which are rotatably pinned at 84, 86 to clevises 88, 90 respectively, as best viewed in FIG. 3. The clevises 88 and 90 are shown as integrally formed with the mount roll ring 44 in fixed attachment to the engine casing 16. Rotatable pinning at 84, 86 may be accomplished by a single pin member 91 thereby facilitating ease of assembly and disassembly. The engine casing 16 maintains a rigid connecting link between the pin 58 and the pins 84, 86 providing a fixed triangular relationship between the pinned points of the thrust mount 46 as may be best appreciated by viewing the phantom triangle T in FIG. 2.

Additional support is provided around the engine casing 16 at the clevis 56 by two axially spaced apart circumferential support rings 92, 94 which peripherally join the inside surface of the engine casing 16 and the outside surface of the outer diffuser wall 96. It will be noticed that clearances have been maintained between the link member 82 and the clevis 90 in order to accommodate thermal expansion. It will be further appreciated that the pinned arrangement permits either the forwardly extending thrust frame member 52 or the rearwardly extending thrust links 54 to thermally expand or contract without inducing a restraint on the other.

As previously discussed, when the jet reaction thrust of a gas turbine engine is imparted to an aircraft through a single transfer point or through a number of transfer points in a single plane normal to the engine axis and off the axis of the engine, there is incurred a high bending moment in the exact point or plane of thrust application. The high bending moment may be sufficient to induce deflection and distortion along the length of the engine casing resulting in what are commonly referred to as "compressor, turbine or seal rubs." Such rubs occur when the tips of the turbine blades, fan blades or seal scrape against the inner surfaces of their associated shrouds.

The thrust mount arrangement of this invention, however, overcomes these disadvantages by distributing the thrust load at two axially spaced apart locations on the engine casing 16. The thrust load is divided and applied to the engine casing 16 through the forwardly extending thrust frame member 52 and the rearwardly extending thrust links 54. The overall reduction in the engine bending moment may be more readily appreciated by referring to the graphical representation of engine bending moments shown in FIG. 1.

The engine bending moment, which is equal to thrust loading times the engine radius, is plotted as a function of the axial length of the engine with the ordinate representing actual engine bending moment and the abscissa corresponding directly to the engine axis. Whereas the forward and aft hanging mounts 40, 42 counteract the bending moment induced by the thrust mount, there can be seen to be zero bending moment at the locations of these mounts. Curve A represents the engine bending moment for a conventional thrust mount of the type wherein all of the thrust loading is applied to the engine casing in a plane normal to the engine axis and through the collar 50.

By contrast Curve B represents the engine bending moment for the thrust mount arrangement of this invention which distributes the thrust loading to two transfer points axially spaced apart along the engine casing. Curve B has two peak bending moments which operate in opposing directions and which correspond to the two transfer points of thrust application.

The peak bending moments now occur at the interconnection between the engine casing 16 and thrust frame member 52 at clevis 56 and at the interconnection between the rearwardly extending thrust links 54 and engine casing 16 with a substantially constant bending moment therebetween. Although the thrust mount arrangement of this invention incurs two peak bending moments, neither of these bending moments is greater than the single bending moment of the conventional thrust mount of Curve A, and the shaded area between Curve A and B represents a reduction in the overall bending moment encountered by the engine.

As is readily apparent, the thrust frame member 52 is of greater length than the thrust links 54 and therefore transfers a greater portion of the thrust loading to the clevis 56. This is evidenced by the greater peak bending moment at the clevis 56 transfer point in comparison to the peak bending moment at the other transfer point between thrust links 54 and the engine casing. This uneven distribution in thrust loading is quite deliberate so as to direct the bulk of the thrust loading to that part of the engine casing embraced by the support rings 92, 94 which are of sufficient strength to resist the type of localized casing deflection previously discussed.

However, the invention is by no means limited to the ratios of thrust distribution so illustrated, but may be readily adjusted for any particular engine application by varying the relative lengths of the thrust frame member 52 and thrust links 54.

It will also be noticed in FIG. 3 that a clearance has been provided between the forwardly extending cantilever 55 and its associated clevis 56. This clearance insures that any lateral loading of the thrust frame member 52 will be transferred to the clevises 76, 78, 88 and 90 as fore and aft axial loads together with side shear load. The thrust mount arrangement of this invention is virtually failsafe in that if either the thrust frame member 52 or thrust links 54 should fail, the remaining connection would be sufficient to sustain the thrust load by itself. Another feature of the thrust mount of this invention is that it may be readily adaptable for mounting an engine to either side of an aircraft of the type having engines mounted to the side of the fuselage. In such a case the clevises may be formed on either side of the engine casing so that all that would be required to switch an engine from one side of the fuselage to the other is removal and reinsertion of pin 58 within the end of the thrust frame member 52 and pin 91 within the ends of the thrust links 54.

Although the thrust mount arrangement of this invention has been described in relation to a gas turbine engine of the straight turbojet type, it will be understood to have broader application to all types of gas turbine engines including turbofan and turboshaft engines. Also, the thrust mount arrangement is not limited to utilization with an aircraft, but may alternatively be utilized in conjunction with water borne vessels or land based vehicles. Therefore, having described a preferred embodiment of the invention, though not exhaustive of all possible equivalents, what is desired to be secured by letters patent is claimed below.

What is claimed is:

1. A load distributing thrust mount arrangement for imparting the propulsive thrust of a gas turbine engine to a vehicle comprises:
   a dowel extending outwardly from the vehicle in general orthogonal alignment to the axis of the gas turbine engine,
   a collar in slidable engagement with the rod and spaced apart relation to the outer casing of the engine;
   a rigid thrust member between the collar and engine casing in rotatably pinned connection to the engine casing;
   a mount roll ring around the engine in axially spaced relation to the pinned connection between the thrust member and engine casing for insuring rigidity in the area of the engine casing adjacent the roll ring;
   a hanging mount interconnecting the vehicle and roll ring for sustaining a portion of the weight of the gas turbine engine relative to the vehicle;
   a second hanging mount interconnecting the vehicle and engine at a location spaced axially apart from the roll ring for sustaining the remaining portion of the weight of the gas turbine engine relative to the vehicle;
   and a rigid thrust link between the collar and mount roll ring in rotatably pinned connection to the roll ring at a location spaced axially apart from the rigid thrust member such that the rigid thrust member and rigid thrust link coact to distribute the thrust load to two axially spaced apart locations on the engine casing thereby reducing the maximum engine bending moment.

2. The thrust mount arrangement of claim 1 wherein the rigid thrust member
   is of greater length than the thrust link to transfer a greater portion of the thrust load as received from the engine.

3. The thrust mount arrangement of claim 2 wherein the rigid thrust member includes a frame having a forwardly extending link member rotatably pinned to the engine casing with two link members diverging rearwardly from the forward link member and joined at the aft ends by an interconnecting link including two spaced apart link members extending rearwardly from the opposing ends of the interconnecting link with the spaced apart link members rotatably pinned to opposing sides of the collar.

4. The thrust mount arrangement of claim 3 including a first clevis extending outwardly from the engine casing for rotatably pinning the forward link member and two spaced apart clevises formed integral to the collar for rotatably pinning the two rearwardly extending spaced apart link members respectively.

5. The thrust mount arrangement of claim 2 wherein the rigid thrust link includes: two spaced apart link members formed integral to the collar and extending rearwardly therefrom, and two spaced apart clevises extending outwardly from the roll ring for rotatably pinning the two spaced apart link members respectively.

6. The thrust mount arrangement of claim 2 wherein the rigid thrust member includes a frame having a forwardly extending link member rotatably pinned to a first clevis extending outwardly from the engine casing with two link members diverging rearwardly from the forward link member into respective connection with two spaced apart rearwardly extending link members, each one of which is rotatably pinned in coaxially spaced relation to the other, to a respective clevis formed integral to the collar; and wherein the rigid thrust link includes two spaced apart link members formed integral to the collar and extending rearwardly therefrom, each one of which is rotatably pinned in coaxially spaced relation to the other, to a respective clevis extending outwardly from the roll ring.

7. The thrust mount arrangement of claim 2 wherein the rigid thrust member includes a frame having a forwardly extending link member rotatably pinned to the engine casing with a link means diverging rearwardly from the forward link member into respective connection with two spaced apart link members, each one of which is rotatably pinned in coaxially spaced relation to opposing sides of the collar; and wherein the rigid thrust link includes two spaced apart link members extending rearwardly from the collar, each one of which is rotatably pinned to the roll ring in coaxially spaced relation to the other.

8. The thrust mount arrangement of claim 2 wherein the rigid thrust member includes a frame having a forwardly extending link member rotatably pinned to the engine casing with link means diverging rearwardly from the forward link member into rotatable engagement with opposing sides of the collar.

* * * * *